March 2, 1965  G. B. GREENE  3,171,529
CODE CONTROLLED MASTER CONTROL APPARATUS
Filed Dec. 5, 1961  3 Sheets-Sheet 1

INVENTOR.
GEORGE B. GREENE
BY
Lippincott, Ralk & Hendricson
ATTORNEYS

March 2, 1965      G. B. GREENE      3,171,529
CODE CONTROLLED MASTER CONTROL APPARATUS
Filed Dec. 5, 1961      3 Sheets-Sheet 2
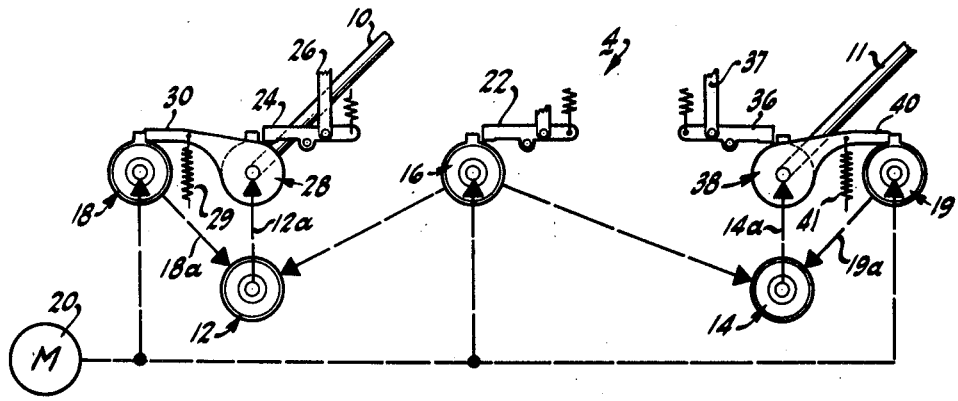
FIG-4
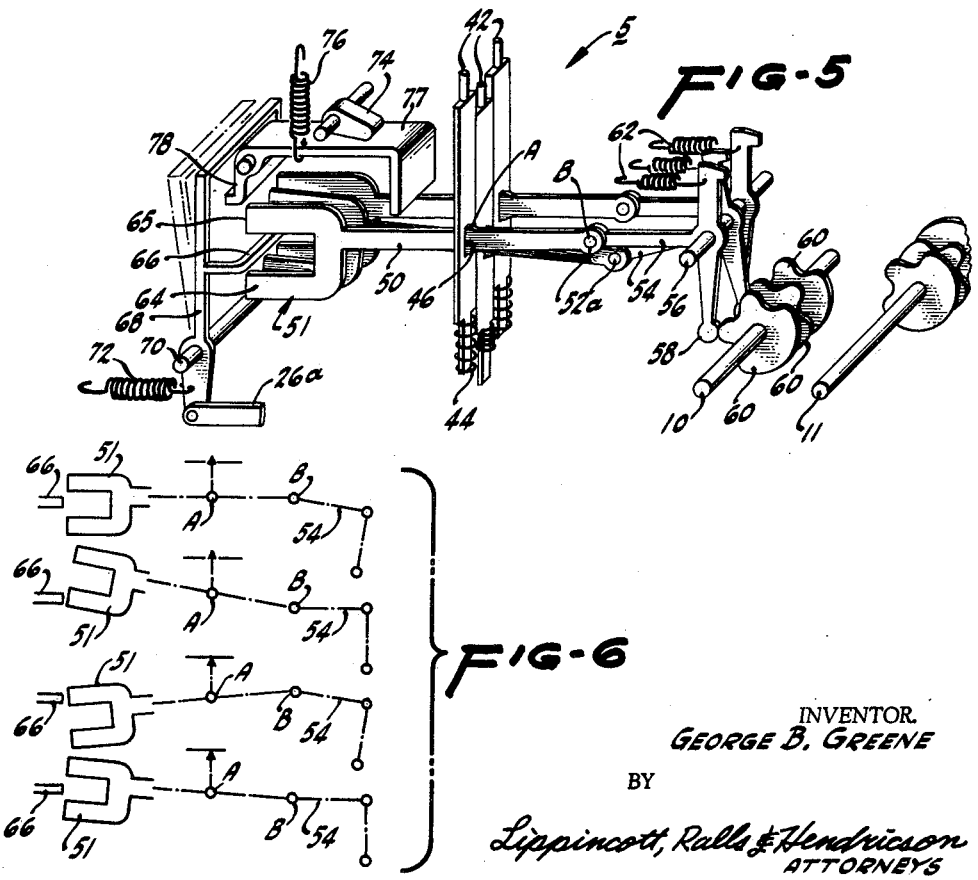
FIG-5
FIG-6
INVENTOR.
GEORGE B. GREENE
BY
Lippincott, Ralls & Hendricson
ATTORNEYS March 2, 1965  G. B. GREENE  3,171,529
CODE CONTROLLED MASTER CONTROL APPARATUS
Filed Dec. 5, 1961  3 Sheets-Sheet 3

INVENTOR.
GEORGE B. GREENE
BY
Lippincott, Ralk & Hendrickson
ATTORNEYS 3,171,529
CODE CONTROLLED MASTER CONTROL
APPARATUS
George B. Greene, Pinole, Calif., assignor to Greene
Datatape Inc., Kearny, N.J., a corporation of New
Jersey
Filed Dec. 5, 1961, Ser. No. 157,147
26 Claims. (Cl. 197—19)

This invention relates to a master control apparatus and, more particularly, to a master control apparatus for controlling the operation of slave devices, such as the keyboard levers of a conventional typewriter.

In normal office practice, much correspondence and business writing relates to matters adequately covered in form letters, passages or descriptions. Frequently, such matter is efficiently contained in printed forms and, in many instances, such forms are adequate. However, the impersonal nature of a printed form often precludes their use in business correspondence. Moreover, much of the repetitive written matter dealt with in the conduct of business relates merely to portions, such as product descriptions, of more lengthy business papers and, because it may be desired to use any one of various combinations of these form passages in a business paper, pre-printing of the paper cannot be done practicably. As a result, much labor time is consumed in repetitive typing of the same matter. Consequently, there is a need for means which may be operated in conjunction with a conventional typewriter whereby form matters might be codified and selected in any desired combination automatically to operate the typewriter.

It is, therefore, an object of this invention to provide an apparatus that might be employed with a typewriter or the like to permit optional automatic and manual operation thereof.

It is a further object of this invention to provide a device that may be connected to a standard typewriter and operated in master-slave relationship therewith.

The master control unit of this invention includes a code-controlled drive mechanism which operates to position both of a pair of shafts in pre-selected angular positions so that cam devices or the like arranged on the shaft can be presented in a number of different position combinations to actuate components selected according to the particular position combination. The selected components, in turn, cause operation of an associated slave function member, such as a key on a conventional typewriter. The drive mechanism comprises a differential mechanism to which opposing rotational inputs are delivered by start and stop single revolution clutches which are actuated in timed sequence. Thus, when the start clutch is actuated an output is delivered from the differential until at a specific subsequent instant the stop clutch is actuated so that the inputs are completely nullified and no output is delivered from the differential mechanism. Thus, the shaft driven by the differential is rotated through an arcuate increment and then held at dwell while the two clutches operate simultaneously to nullify each other. Then, when the start clutch completes its single revolution the stop clutch acting alone returns the shaft back to its initial starting point. The particular position at which each shaft stops is determined by a series of three reciprocable pins which sense the three-hole half-code controlling the particular shaft. With the three pin array there are eight different combinations of up and down positions in which the pins might be disposed. These pins are pivotally connected to one portion of a comparator arm and acting against another portion of the comparator arm are three cam followers influenced by an array of cams which produce a similar combination of eight different up or down positions thereof. When the combination of positions translated to both portions of the comparator arm are in harmony, the arms are in mechanical alignment and the clutch is actuated to put the data shaft in a condition of dwell. On the data shaft are a series of radial cam lugs, the angular disposition of which depends upon the dwell condition of the shaft. With the two data shafts being stopped according to the eight-position code, a combination of sixty-four conditions can exist between the two shafts and between cam members mounted on the two shafts. Sensing devices adapted to contact the cam elements on the two shafts are operated according to a given condition of the cam members. Thus actuating members pivotably mounted on movable motion transmitting arms are conditioned to pivot relative to the arms in particular angular positions of the data shaft and thus to operate slave function members. For example, when both cam lugs of a pair are in specific angular disposition, an arm pivoted toward them is tripped to operate a slave function member. The master control mechanism also includes means for stopping the shafts for performance of given operation, including tape punching, in response to manual operation of the keyboard. Here, a similar array of cams with radial cam lugs are mounted on the shaft and, when a key is depressed, the particular cam lugs associated with that key lever contact means on the lever after they rotated to an operative position relative thereto. This position will determine the code position of the shaft for operation of other typewriter control mechanisms or the tape punch means.

Other objects and advantages of this invention will become apparent from the specification following when read in connection with the accompanying drawing wherein:

FIG. 4 is a schematic illustration of the drive mechanism of this invention;

FIG. 5 is a schematic illustration of the tape reader associated with the drive mechanism;

FIG. 6 is a schematic illustration of several conditions of the tape reader;

Figure 1:
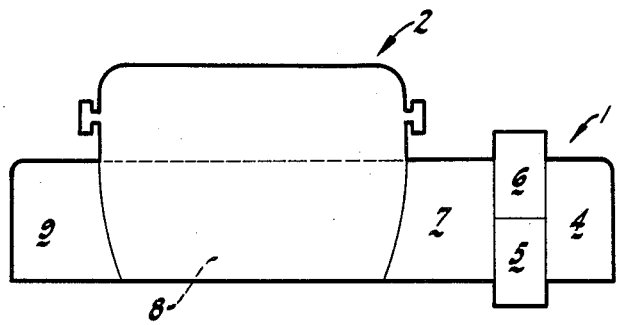
FIG. 1 is a schematic illustration of the arrangement of the control apparatus of this invention in association with a conventional typewriter.

Referring to the drawings in greater detail, the master control apparatus of this invention 1 may be mounted on a conventional typewriter 2 as shown to form a compact, selectively manually or automatically operated assembly therewith. As illustrated in block form in FIG. 1, the typewriter master control devices comprise six major components, a matrix drive unit 4, which drives the mechanical elements through increments dictated by code signal, a tape reader 5 which senses and detects punched code indicia, a tape punch 6, an automatic control unit 7, by means of which special code operations are translated, the main typewriter keyboard control unit 8, and an auxiliary manual keyboard 9. The operation of certain ones of the various units will hereinafter be described in greater detail. Common to all of the units is a pair of data shafts 10 and 11 (FIGS. 3 to 9) which extend across the entire length of the master control device 1. As will hereinafter be described, various cams, stop lugs and the like are mounted along the lengths of the data shafts and cooperate with other machine elements in various ways dependent upon their angular disposition.

Figure 2:
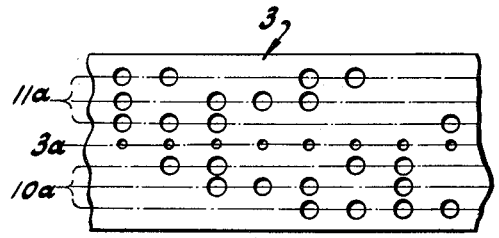
FIG. 2 illustrates the six-hole punch code tape adapted to be used with this control apparatus.
Figure 3:
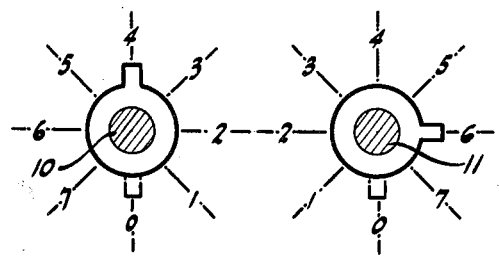
FIG. 3 shows the eight angular positions in which each of the data control shafts might be disposed.

Referring to FIG. 3, it will be seen that each of the front and rear data shafts 10 and 11 has eight distinct positions, a normal zero position of rest and seven other positions to which each may be moved. Thus, cams or other components mounted on the shaft may be situated in each of eight angular positions and components on the two shafts together can present sixty-four different position combinations. The eight positions in which each data shaft may be disposed are codified in the eight different combinations possible in a three-place half-code 10a, 11a of a conventional six-hole perforated tape or card 3, such as that illustrated in FIG. 2 with a control row of pin-feed perforations 3a. Together the two half-codes, each of which controls one of the data shafts 10 and 11, permit sixty-four shaft position combinations. In actual commercial embodiment it is contemplated that a revolution of a data control shaft will be divided into twelve increments although only eight of them will be actually used in response to data code signal. Certain of the increments will be utilized for operational delay time in order to permit operation of system-conditioning devices or of components of the controlled machine itself, as in typing or tape punching. However, for purposes of illustration, the eight active positions of each data control shaft 10 and 11 may be regarded as being equally spaced around its 360° of rotation.

It is the function of the matrix drive unit 4, illustrated more specifically in FIG. 4 to rotate the front and rear data shafts 10 and 11 to a selected angular disposition and hold them in this position until the appropriate components associated therewith have performed the desired function. Each of the data control shafts 10 and 11 is driven from a differential drive mechanism 12 and 14 by means of a positive or start clutch 16 and a negative or stop and return clutch 18 or 19, all of which may be driven from a single motor 20. All the clutches 16, 18 and 19 are of the single revolution type, and all deliver the single revolution at the same speed. For greater versatility, a separate start clutch may be provided to drive each differential, e.g., selective bi-directional rotation, but as shown a single start clutch 16 may be provided to drive both differentials in forward directions, a stop and return clutch 18 and 19, being provided to drive each differential in a reverse direction. Thus, when both positive and negative clutches are operated simultaneously, the input of each nullifies that of the other and there is no rotation at the differential output 12a or 14a. The particular angular disposition of the data control shaft driven by each differential output shaft during this period of dwell is determined by the period of time during which only the positive or start clutch is operated. Thus, referring to front data control shaft 10, if positive control clutch were engaged at a given instant with negative control clutch inoperative, the differential output 12a would be in a positive direction and the data control shaft would be turned through an increment of rotation. Then, if at a subsequent given instant prior to completion of the positive single revolution, the negative one-revolution clutch were engaged, the input from the positive control clutch would be completely neutralized and data control shaft 10 would be stopped. This condition of dwell would continue until the single revolution delivered by the positive control clutch is completed, and thereafter the remaining portion of the single revolution delivered by the negative or stop and return clutch 18 would be unopposed and the data control shaft 10 would be driven in the opposite direction to return it to its original position.

The relative times at which the start control clutches 16 and stop control clutches 18 and 19 are engaged are determined automatically by tape code in a manner hereinafter to be described. The start of the cycle, i.e., the time at which the start clutch is engaged, may be dictated by conditions of the typewriter 2 signifying completion of previous machine operation. For example, in automatic operation, any suitable device (not shown) may be provided to operate the start clutch when the machine completes a previous operation and, in manual operation of the machine, the start clutch control 22 may be operated in response to depression of a key.

Preferably, the stop clutch is assisted by a suitable brake 28 which seizes the data shaft upon completion of the predetermined increment of rotation thereof. Considering the drive for data shaft 10, the control element 24 for such a brake may be operated by any suitable linkage 26 in response to completion of the desired increment of rotation, as will be described. After the brake 28 seizes the shaft 10, it is pivoted therewith against the action of a spring 29 or the like through the few degrees necessary to bring the shaft 10 to a complete stop. This partial rotation of the brake 28 during stopping of the data shaft 10 causes a stop clutch control pawl 30 extending therefrom to be withdrawn from the stop clutch 18 to engage the clutch and initiate its single revolution input delivered to the differential. Thus, the stop clutch 18 is engaged when the brake stops the shaft 10 at the selected angle. The torque developed by the data shaft brake 28 accelerates the stop clutch input 18a so that motion actually progresses prior to the normal response time of stop clutch 18. Moreover, the torque stored in the elastic brake mount 29 causes the data shaft to reverse promptly to its original selected position so that the effect of the stop clutch is realized to precisely the desired angle. The operation of the other data control shaft 11 is controlled in the same manner. After the start control clutch 16 turns shaft 11 to the proper angle selected by the code in a manner hereinafter to be described, the brake control member 36 is operated by linkage 37 to engage brake 38 on shaft 11 and cause arm 40 to initiate operation of the stop clutch 19, the torque stored in the brake 38 accelerating the stop clutch output 19a while the elastic mounting 41 returns the shaft 11 to its original selected position.

Referring now to FIG. 5, there is shown the structure of a tape reader 5 wherein the tape code is interpreted and engagement of the stop control clutches 18 and 19 is controlled and initiated. There, a series of three-code reading pins 42 constitute a complete array for interpretation of the three-hole half-code 10a (FIG. 2) applied to the control of the front data shaft 10. A similar array of three pins (not shown) controls the rear data shaft 11. Each of the pins 42 is spring mounted at 44 and normally urged upward against a code-perforated tape or card and is capable of passing through a code punched hole sensed thereby. Of course, when no hole is present in the tape full movement of the pin is prevented. Thus, as is conventional in such readers, the pins may be situated in either of two discreet positions, extended or retracted, dependent upon the presence or absence of a hole in the portion of the tape sensed thereby. In a slot 46 milled into the shank of each pin, a comparator fork arm 50 is positioned so as to rotate freely thereon in a loose fit permitting some longitudinal displacement. One end of each comparator arm 50 is pivotally connected at 52a to a bell crank lever 54 pivoted on a shaft 56. The other arm of each bell crank 54 comprises a cam follower 58 urged against cam 60 on the data control shaft 10 by means of a spring 62. Each of the three cams 60 included in the half-code assembly of three sensing pins and comparator arms 50 is designed and arrayed in the cam series so that together eight different combinations of in and out positions of the three cam followers 58 is possible. This corresponds to the eight combinations of up and down positions of the sensing pins 42 possible in the three-hole half-code 10a, 11a controlling the drive of each data control shaft 10 and 11. Thus, the selected combination of pin positions determined by the tape code is correlated to the selected angular position of data shaft 10 or 11 through the operation of cams 60. In the embodiment illustrated, each cam follower is urged by a spring to be controlled by a single cam. However, in practice more positive action might be realized if two cams were provided to work against each follower in opposition.

It is the function of the comparator arms 50 to indicate the position of the data shaft 10 in which the array of cams 60 reflect the particular combination represented by the positions of the pins 42. The free end of each of the comparator arms 50 is bifurcated to form a comparator fork 51 cooperatively associated with, and engaged by comparator bail 66 extending from the arm 68 pivotally mounted at 70 and resiliently biased by spring 72. The position of each pin 42, up or down dependent upon the presence or absence of a hole in the tape, governs the position of the portion A of the comparator arm pivotally carried thereon. Similarly, the pivotal action of the cam follower 58 which rotates arm 54 governs the location of pivot point B on comparator arm 50. Each comparator arm may be moved into four positions illustrated in FIG. 6. If the pin 42 associated with the comparator arm 50 is raised and cam follower arm 54 is lowered the comparator arm will be upwardly inclined at a relatively sharp angle to bring the lower arm 64 of fork 51 in position to be engaged by the comparator bail 66. If the pin 42 is depressed and arm 54 is elevated, the comparator arm 50 is downwardly inclined sharply, to bring the upper arm 65 of the fork in position to be engaged by the comparator bail 66. When both the sensor pins 42 and the cam followers 58 are in corresponding position, i.e. when both points A and B are simultaneously either raised or lowered the opening between the comparator fork arms 64 and 65 is presented to the comparator bail 66 and, with the fork arms out of the path of comparator bail 66, the arm 68 is permitted under the action of spring 72 to pivot through a full stroke and, in response to this movement, a suitable linkage shown generally as operating arm 26a, actuates the brake control member 24 in FIG. 4 to initiate operation of the stop control clutch 18. The comparator bail 66 is of sufficient length to engage simultaneously all of the three comparator forks 51 in a one-half code assembly thereof. Thus, all of the comparator arms 50 must be in a position wherein the cam followers 58 correspond to the position indicated by the pins 42 before the comparator bail can be received between the fork arms 64 and 65. This occurs only when the same code combination indicated by the tape is reproduced by the cams. At this point, the data shaft is at the desired angular position for operation of components thereon.

Also associated with the comparator arm 50 is a pin withdrawal bail 77 which, prior to commencement of the sensing cycle is depressed by cam 74 into engagement with the comparator arms, to move the pins out of engagement with the tape. At the commencement of each sensing cycle, the cam 74 is rotated to permit spring 76 to inactivate the withdrawal bail 77 and, by pivoting a second arm 78, permit the comparator bail 66 to move into operative association with the forks 51.

Summarizing the operation of the data shaft code-controlled drive means with particular reference to the operation of the front data shaft 10, the drive commences after completion of the previous slave machine operation. The control element 22 for the start clutch 16 is operated in order to commence rotation of the differential output shaft 12a and, hence, the front data shaft 10. Before the data shaft 10 reaches the first of its eight active positions, the pin withdrawal control cam 74 is rotated so that the sensing pins 42 are urged upward into engagement with the tape, the presence or absence of holes opposite each pin determining the up or down position thereof, and hence of point A on the comparator arm 50. Then, data shaft 10 commences rotation carrying the array of three cams 60 around so that the cam followers 58 urged by the springs 62 pivot the arms 54 up and down until all three points B are in the appropriate position dictated by the pin control of point A and all three comparator forks 51 are in alignment to permit entry of the comparator bail 66. As soon as the bail 66 enters the aligned forks to allow the full pivotal stroke of arm 68, the brake control linkage 26a, 26 actuates the brake 28 on the differential output shaft to stop the data shaft 10, thus releasing the stop control clutch 18 to deliver a negative input to the differential 12, completely neutralizing the positive input delivered by start clutch 16. Then, after the start clutch completes its single revolution, the same time gap remains for the stop clutch to operate so that the data shaft 10 is thereafter returned to its initial starting position. In timed relation with this operation the cam 74 of FIG. 5 rotates to a position engaging the pin withdrawal bail which depresses the pins to a position preparatory to the next sensing operation.

Figure 7:
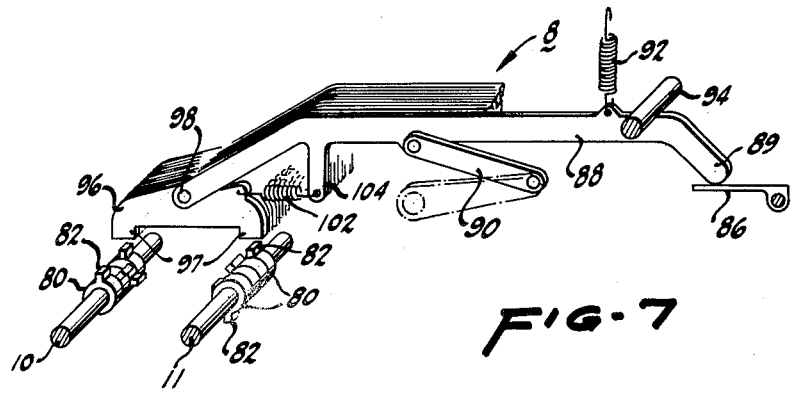
FIG. 7 illustrates the keyboard control mechanism forming a part of this invention.

Referring now to FIG. 7, the receiving system or control units 8 for the typewriter keyboard will be described in connection with the schematic illustration thereof. Secured onto each of the data shafts 10 and 11 is a series of cam members 80, each positioned with a radial cam lug 82 in one of the eight active positions illustrated in FIG. 3. As previously pointed out, the eight positions of each data shaft 10 and 11 provides sixty-four different combinations in which the cam lugs may be presented. As will be described, it is only the two aligned lugs which are presented in their uppermost position that will produce actuation of a keyboard member. Associated with each slave function member to be operated by the assembly, such as a typewriter keyboard element shown generally at 86, is a motion transmitting arm or receiving lever 88, the free end 89 of which is normally resiliently urged as by a spring 92 against a stop 94. The shank of the receiving lever is normally supported in its upper position by an interrogation bail 90 which, after the poistions of the data shafts 10 and 11 have been determined as previously described, is depressed by any suitable means (not shown) to lower the intermediate portion of the receiving lever 88. During the initial portion of this stroke, the inner end of receiving lever 88 is pivoted freely about the stop 94 against which it is resiliently held by a spring 92. However, on the other end of each receiving lever 88 an actuating member or yoke 96 is pivotally mounted to depend therefrom and present a pair of spaced contact members 97 adapted to engage upwardly extending cam lugs in their path. When both cam lugs 82 of a pair thereof on the two data shafts are extended vertically upward in the paths of the contact members 97 on the yoke associated therewith, further depression of that particular receiving lever 88 is prevented and continued pivotable movement of interrogator bail 90 causes that receiving lever 88 to pivot about the pivotal connection 98 between the lever and its yoke 96. With such pivotal movement, the free end 89 of that lever overcomes the spring 92 to engage and operate the typewriter key or other slave function member 86 controlled thereby. Of course, while the radial cam lugs 82 function more efficiently as stops in their vertical upward positions, it is apparent that the contact members 97 and the stroke of the interrogator arm can be adjusted to contact a pair of radial lugs in other selected angular dispositions. The yoke 96 is normally held in center position by means of a spring 102 extending between the yoke 96 and an arm 104 on lever 88, but if only one cam lug is engaged, the spring 102 will yield to permit the yoke 96 to pivot about the pin 98 again without withdrawing the free end of the receiving lever from its stop 94. If no lug is engaged by either end of the yoke 96 the interrogator bail 90 will be permitted to complete its pivotal movement without withdrawing the free end 89 from the stop 94.

The keyboard operation takes place during that period of matrix driving operation during which both data shafts are at rest, that is, during the period of dwell after actuation of the stop clutch 18 or 19 and before the completion of the start clutch 16 single revolution. After the various cams 80 are positioned to select the appropriate receiving lever 88 for machine operation, through the single combination which presents both of the selected pair of cam lugs vertically upward, the data shafts 10 and 11 return to their initial neutral position through operation of the stop clutch 18 as previously described. Receiving levers 88 are also employed in the program unit shown as 7 in FIG. 1 in which various commands are interpreted to bring about a series of programmed acts in similar manner.

Figure 8:
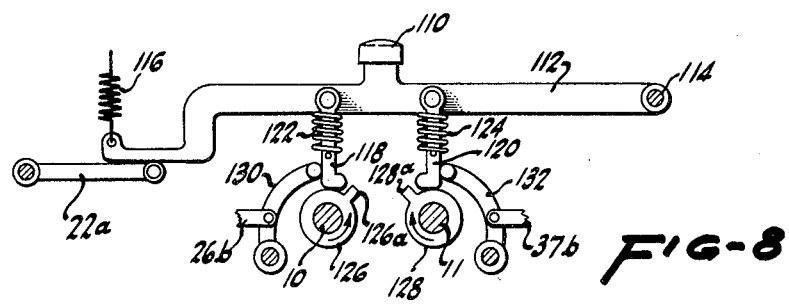
FIG. 8 illustrates the manual drive mechanism control forming a part of this invention.

Referring now to FIG. 8, the operation of the key control units 7 or 8 to control partial rotation of the data shafts for transmission of code information will now be described. In conventional manner, each typewriter key 110 is secured onto an arm 112 pivotably mounted on the machine at 114 and normally resiliently biased in an upward direction by suitable spring means 116. Added to this conventional structure are interposer cam follower levers 118 and 120 pivotably carried on the key lever 112 to depend therefrom. Erecting springs 122 and 124 normally hold the interposer levers in vertical downward disposition. Each of the data shafts 10 and 11, which are rotatably mounted below the interposer levers 118 and 120, carries a cam member 126, 128 having variably directed radial cam lugs similar to those associated with the receiving system illustrated in FIG. 7, each key lever 112 having a particular pair of lugs associated therewith. A start bail 22a, directly connected to the start clutch control 22 of FIG. 4 is operated upon depression of the key 110. When the key 110 is depressed, the start clutch operation is connected and data shafts 10 and 11 are caused to rotate in the directions indicated by the arrows in FIG. 8. This depression of the key lever 112 moves the interposer levers 118 and 120 thereon downward into the arcuate path of travel of the particular pair of cam lugs 126a and 128a associated therewith. Thus, when the particular pair of cam lugs directly below the key lever 112 rotate to their vertically upward positions, they engage the camming surface of interposer cam follower levers 118 and 120 causing them to deflect through an arcuate period of rotation to transmit similar pivotal movement to stop bails 130 and 132 associated therewith. Directly connected to each stop bail 130 and 132 is a suitable linkage 26b, 37b which operates the data shaft brake 28 and 38 of FIG. 4, thus commencing operation of the stop clutch to stop the data shafts 10 and 11 in the selected one of the sixty-four combinations of angular positions in which they may be disposed.

Figure 9:
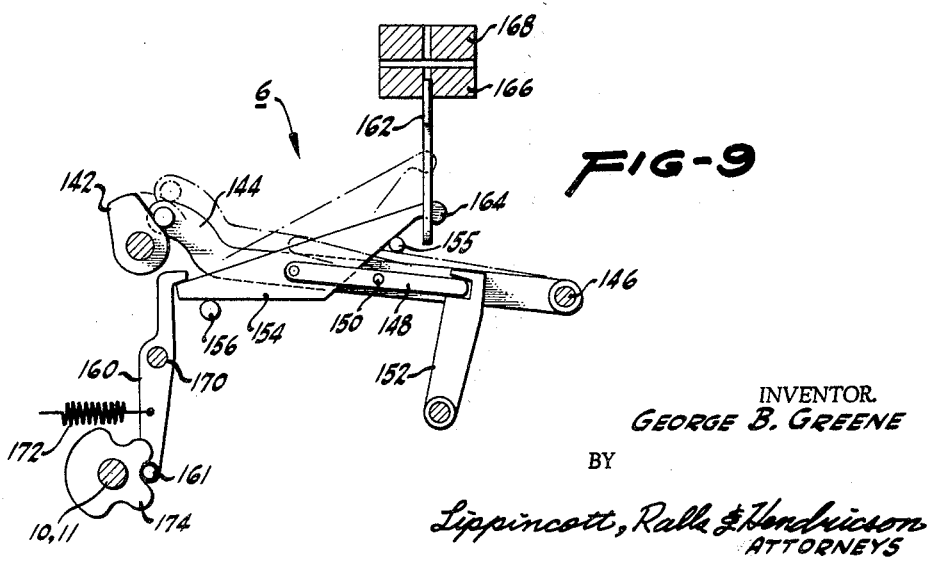
FIG. 9 illustrates a tape punch forming another part of this invention.

Referring now to FIG. 9, there is illustrated a half-code unit of the tape punch assembly 6, each half-code tape punching operation being controlled by one of the data shafts 10 and 11. There, a punch control cam 142 is rotated through a single revolution during each operation causing a motion transmitting arm or cam follower 144 to be pivoted upwardly about point 146 to the position shown in phantom and then again lowered on the return stroke. The operation of the cam 142 is timed so that the upward pivotable movement occurs during the dwell period when the data shafts 10 and 11 have been positioned as previously described. In conjunction with each half-code unit, a series of three control arms 148 are pivotably mounted on the cam follower 144 about a point 150 and are jointly engaged by a master control hook 152 when the tape punch unit 6 is operated. When the punch unit 6 is inactive the master control hook is withdrawn to free the ends of control arms 148, but when the control hook 152 is engaged it functions as a pivot for the control arms 148 which, because of their pivotal connection 150 to the cam follower 144, are pivoted thereby to the upper position shown in phantom carrying all the actuating members or punching beams 154 with them. The punching beams are pivotally mounted about a stop 156 when engaged by the individual control hook 160 acting on each punching beam 154. Thus, when the individual cam follower or control hook 160 is engaged, the appropriate punching beam 154 is raised to the position shown in phantom to drive the punch pin 162, which is milled onto a cylindrical end 164 thereof upwardly to perforate the tape. The tape is drawn through a suitable tape guide 166 and is perforated through a guide block 168 associated with the array of pins 162. Each individual control hook is pivotally mounted at 170 and urged by spring 172 into engagement with a cam 174 mounted on the data shaft 10 or 11 governing the particular three-hole half-code perforated by the array of three punches 162. Thus, when the key lever 112 of FIG. 8 is depressed to determine the proper position of data shaft 10, the array of cams 174 is presented to cam followers 161 on the control hooks 160 and determines for an individual code position either a punch or no punch condition for each of the three punch pins 162. If the no-punch position is dictated for a particular pin, the cam follower control hook is withdrawn and pivotable movement of the control arm 148 merely pivots the punch beam 154 free from the stop 156 without any drive force being placed on the pin 162. Then, when the control arm 148 is returned, the punching beam engages about the stop 155 to bring the other end of the punching beam below the engagement level of the control hook 160. When the punch position is dictated, the punching beam 154 pivots about stop 156 and, on the return stroke its engagement with stop 156 forcibly pivots the punching beam 154 to pull the punch pins 162 free from the tape. The array of cams is designed and arranged to present the eight combinations of punch or no-punch conditions in the half-code governed by the particular data shaft 10 or 11.

It is apparent that other modifications and changes in the embodiment illustrated may be made by those skilled in the art without departing from the spirit and scope of the invention defined by the claims appended hereto.

What is claimed as invention is:

1. Mechanism for producing a predetermined increment of rotation in a shaft comprising
    a differential drive connected to rotate said shaft,
    positive and negative single revolution clutches operative to deliver equal opposing rotational inputs to said differential drive,
    start control means for positively actuating said positive single revolution clutch, and
    stop control means operated by means on said shaft for positively actuating said negative single revolution clutch when said differential drive has rotated said shaft through a predetermined arc.

2. The shaft positioning means defined in claim 1 wherein said stop control operating means includes
    cam means on said shaft, and
    cam follower means for actuating said negative clutch.

3. The drive mechanism defined in claim 1 wherein said stop control operating means comprises
    a series of cam members on said shaft,
    a series of cam followers operatively associated with said cam members, and
    negative clutch actuating means operated by said series of cam followers only when said followers are in predetermined relative positions.

4. The drive mechanism defined in claim 1 wherein said stop control operating means comprises
    at least two comparator arms with each having first and second portions,
    a positioning member acting transversely against a first portion of each of said comparator arms selectively to position said first portion thereof in one of first and second transversely displaced positions,
    a series of cam means on said shaft acting tranversely against the second portion of each of said comparator arms to move said second portions in varying sequence into first and second transversely displaced positions, and
    means engaging all of said comparator arms and operative to actuate said negative clutch when both first and second portions of all of said comparator arms are in the same one of their respective first and second positions.

5. The shaft positioning means defined in claim 4 wherein
each of said positioning members comprises a pin adapted to pass through holes in a code-perforated member,
resilient means biasing said pin for engagement with a code-perforated member, and
means pivotally mounting said pin on one of said comparator arms, to extend transversely thereof.

6. The drive mechanism defined in claim 1 wherein said stop control means comprises
a series of levers pivotally mounted adjacent said shaft,
resilient means urging each of said levers into a normal inactive position,
each of said levers being movable to an active position,
a series of cam members on said shaft having actuating portions in varying angular positions,
a cam follower pivotally mounted on each of said levers engageable by the actuating portions of a pair of cams when said lever is in said active position, and
mechanism operated by said cam followers upon engagement thereof for actuating said negative clutch.

7. The drive mechanism defined in claim 6 including means on each of said levers engageable with said start control means to operate said means when a lever is moved to the active position thereof.

8. Mechanism for producing a predetermined increment of rotation in a shaft comprising
a differential drive mechanism connected to rotate said shaft,
common speed positive and negative single revolution clutches connected to said differential drive mechanism for delivering equal and opposite rotational inputs thereto,
start control means for postively actuating said positive clutch,
a brake operative to stop said shaft,
negative clutch control means on said brake conditioned to positively actuate said negative clutch when said brake is operated,
cam means on said shaft, and
cam follower means for operating said brake at a selected point in the revolution of said shaft.

9. Mechanism for producing a predetermined increment of rotation in a shaft comprising
a differential drive mechanism connected to rotate said shaft,
common speed positive and negative single revolution clutches connected to said differential drive mechanism to deliver equal and opposite rotational inputs thereto,
start control means for actuating said positive clutch,
a brake operative to stop said shaft,
negative clutch control means on said brake operative when said brake is operated to actuate said negative clutch,
at least one comparator arm,
a positioning member acting transversely against a first portion of said comparator arm selectively to position said first portion in one of first and second transversely displaced positions,
cam means acting transversely against a second portion of said comparator arm to move said second portion alternately into first and second transversely displaced positions, and
means engaging said comparator arm conditioned to operate said brake when both the first and second portions of said comparator arm are in one of their respective first and second positions.

10. Mechanism for producing a predetermined increment of rotation in a shaft comprising a differential drive mechanism connected to rotate said shaft,
common speed positive and negative single revolution clutches connected to said differential drive mechanism to deliver equal and opposite rotational inputs thereto,
start control means for actuating said positive cluch,
stop control means for actuating said negative clutch,
at least two comparator arms,
a positioning member acting transversely against a first portion of each of said comparator arms selectively to position said shank in one of first and second transversely displaced positions,
a series of cam means each acting transversely against a second portion of one of said comparator arms to move said second portion into first and second transversely displaced positions,
said series of cam means moving said second portions in varying sequence, and
means simultaneously engageable with all of said comparator bars conditioned to operate said stop control means when both first and second portions of all of said comparator bars are in the same one of their respective first and second positions.

11. The shaft positioning means defined in claim 10 wherein
each of said selective positioning members comprises a pin adapted to pass through holes in a code-perforated member,
resilient means biasing said pin for engagement with a code-perforated member, and
means pivotally mounting said pin on one of said comparator arms, to extend transversely thereof.

12. Code operated means for actuating a selected one of a series of function members conditioned for operation in response to contact thereof, comprising
a series of levers,
one end of each of said levers being adapted to contact one of said function members,
a stop member adjacent said one end,
resilient means urging said one end against said stop away from said function member,
a contact member pivotally mounted on the other end of each of said levers,
a data shaft rotatably mounted adjacent said contact member,
an axial series of radial lugs on said data shaft extending from said shaft in various radial directions,
intermittently operated means moving the intermediate portion of each of said levers to pivot said each lever about said stop and move said contact member toward said data shaft,
said contact member being spaced from said data shaft so that movement of the intermediate portion of said lever moves said contact member into engagement with one of said radial lugs only when said radial lug is in a specific angular disposition and so that said movement after said engagement pivots said lever about the pivotal connection with said contact member to bring said one end of the lever into contact with said function member,
a differential drive mechanism connected to rotate said data shaft,
common speed positive and negative single revolution clutches connected to said differential drive mechanism to deliver equal and opposite rotational inputs thereto,
start control means for actuating said positive clutch,
a brake operative to stop said data shaft,
negative clutch control means on said brake operative when said brake is operated to actuate said negative clutch,
a brake control member for operating said brake, and
cam means on said data shaft actuating said brake control member at a selected point in the revolution of said data shaft.

13. Code operated mechanism for actuating selected ones of a series of slave function members conditioned for operation in response to contact thereof comprising
   a series of levers,
   one end of each of said levers being adapted to contact one of said slave function members,
   a stop member adjacent said one end,
   resilient means urging said one end against said stop away from said slave function member,
   a yoke having longitudinally spaced contact members pivotally mounted on the other end of each of said levers,
   a pair of data shafts extending transversely of said series of levers,
   each of said contact members being normally positioned adjacent one of said data shafts,
   an axial series of radial lugs on each of said data shafts forming a series of pairs thereof,
   each pair of radial lugs being operatively associated with the contact members on the yoke of one of said levers,
   said lugs extending from each of said data shafts in various radial directions,
   intermittently operated means moving the intermediate portion of each of said levers to pivot said each lever about said stop and move said yoke and contact members toward said data shafts,
   said contact members being spaced from said data shafts so that movement of the intermediate portion of said lever moves said yoke to bring contact members thereon into engagement with the pair of lugs associated therewith only when both of said pair extend in a specific radial disposition and so that said movement after said engagement pivots said lever about said yoke pivotal connection to bring said one end thereof into contact with the slave function member associated therewith,
   a differential drive connected to rotate each of said data shafts,
   common speed positive and negative single revolution clutches connected to each of said differential drive means to deliver equal and opposite rotational inputs thereto,
   start control means for actuating said positive clutch, and
   stop control means operated by means on each of said data shafts to actuate the negative clutch associated therewith.

14. The mechanism defined in claim 13 wherein said stop control means comprises
   a brake operative to stop each of said data shafts,
   a member on each of said brakes conditioned to actuate said negative clutch when said brake is operated,
   a brake control member for operating each of said brakes, and
   cam means on each of said data shaft actuating one of said brake control members at a selected point in the revolution of said data shaft.

15. Code operated means for actuating selected ones of a series of slave function members conditioned for operation by contact therewith comprising
   a series of adjacent levers,
   one end of each of said levers being adapted to contact one of said slave function members,
   a stop member adjacent said one end,
   resilient means normally urging said one end away from said function member and against said stop,
   a yoke having longitudinally spaced contact members pivotally mounted on the other end of each of said levers,
   a pair of data shafts extending transversely adjacent said other end,
   each of said contact members being normally positioned adjacent to one of said data shafts,
   an axial series of pairs of radial lugs on said data shafts,
   each pair of radial lugs being operatively associated with the contact members on the yoke of one of said levers,
   said lugs extending from each of said shafts in various radial directions,
   intermittently operated means moving the intermediate portion of each of said levers to pivot said each lever about said stop and move said yoke and contact members toward said data shafts,
   said contact members being spaced from said data shafts so that movement of the intermediate portion of said each lever moves said yoke to bring contact members thereon into engagement with the pair of lugs associated therewith only when both of said pair extend in a specific radial direction, and so that said movement after said engagement pivots said lever about said yoke pivotal connection to bring said one end thereof into contact with said function member,
   a differential drive mechanism connected to rotate said data shaft,
   common speed positive and negative single revolution clutches connected to said differential drive mechanism to deliver equal and opposite rotational inputs thereto,
   start control means for actuating said positive clutch, and
   stop means for actuating said negative clutch when said differential drive has rotated said data shaft through a predetermined arc.

16. Code operated means for actuating selected ones of a series of slave function members conditioned for operation by contact therewith comprising
   a series of adjacent levers,
   one end of each of said levers being adapted to contact one of said slave function members,
   a stop member adjacent said one end,
   resilient means normally urging said one end away from said function member and against said stop,
   a yoke having longitudinally spaced contact members pivotally mounted on the other end of each of said levers,
   a pair of data shafts extending transversely adjacent said other end,
   each of said contact members being normally positioned adjacent to one of said data shafts,
   an axial series of pairs of radial lugs on said data shafts,
   each pair of radial lugs being operatively associated with the contact members on the yoke of one of said levers,
   said lugs extending from each of said shafts in various radial directions,
   intermittently operated means moving the intermediate portion of each of said levers to pivot said each lever about said stop and move said yoke and contact members toward said data shafts,
   said contact members being spaced from said data shafts so that movement of the intermediate portion of said each lever moves said yoke to bring contact members thereon into engagement with the pair of lugs associated therewith only when both of said pair extend in a specific radial direction, and so that said movement after said engagement pivots said lever about said yoke pivotal connection to bring said one end thereof into contact with said function member, and
   drive means for rotating said data shafts through selectively predetermined arcs to move both members of a selected pair to said specific radial direction.

17. Code operated means for actuating selected ones of a series of slave function members conditioned for operation by contact therewith comprising
- a series of adjacent levers,
- one end of each of said levers being adapted to contact one of said slave function members,
- a stop member adjacent said one end,
- resilient means normally urging said one end away from said slave function member and against said stop,
- a yoke having longitudinally spaced contact members pivotally mounted on the other end of each of said levers,
- a pair of lugs adjacent to and operatively associated with each of said yokes and movable relative thereto,
- intermittently operated means moving the intermediate portion of each of said levers to pivot said each lever about said stop and move said yoke and contact members toward said pair of lugs,
- said contact members being spaced from said pair of lugs so that movement of the intermediate portion of said each lever moves said yoke to bring contact members thereon into engagement with said pair of lugs only when both of said pair are disposed in specific positions relative thereto and so that said movement after said engagement pivots said lever about said yoke pivotal connection to bring said one end thereof into contact with said function member, and
- drive means for moving each of said lugs a selectively predetermined extent to bring one pair thereof to said specific positions.

18. Code operated means for actuating selected ones of a series of slave function members conditioned for operation by contact therewith comprising
- a series of adjacent levers,
- one end of each of said levers being adapted to contact one of said slave function members,
- a stop member adjacent said one end,
- resilient means normally urging said one end away from said slave function member and against said stop,
- a yoke having longitudinally spaced contact members pivotally mounted on the other end of each of said levers,
- a pair of rotatable members adjacent the other ends of said levers with their axes extending transverse thereto,
- a series of radial lugs on each of said rotatable members extending in various radial directions,
- aligned lugs on said rotatable members comprising pairs thereof each operatively associated with the contact members on the yoke of one of said levers,
- intermittently operated means moving the intermediate portion of each of said levers to pivot said each lever about said stop and move said yoke and contact members toward said pair of lugs,
- said contact members being spaced from said pair of lugs so that movement of the intermediate portion of said each lever moves said yoke to bring contact members thereon into engagement with said pair of lugs only when said pair extend in specific radial directions and so that said movement after said engagement pivots said lever about said yoke pivotal connection to bring said one end thereof into contact with said slave function member, and
- drive means for rotating said rotatable members to move a selected pair of lugs to extend in said specific radial directions.

19. Drive mechanism for rotating a pair of shafts fixed angular amounts comprising
- a differential drive mechanism connected to rotate each of said pair of shafts,
- positive and negative single revolution clutches operative to deliver equal opposing rotational inputs to each of said differential drive mechanisms,
- start control means for positively actuating said positive single revolution clutch, and
- stop control means for positively actuating said negative single revolution clutch when said differential drive mechanism has rotated the shaft driven thereby through a predetermined arc.

20. The drive mechanism defined in claim 19 wherein said stop control means comprises
- a series of cam members on each of said shafts, and
- negative clutch actuating means operated by said series of cams only when said cam members are in a predetermined angular relation.

21. The drive mechanism defined in claim 19 wherein said stop control means comprises
- at least two comparator arms,
- a positioning member acting transversely against a first portion of each of said comparator arms selectively to position said shank in one of first and second transversely displaced positions,
- a series of cam means on said shaft acting transversely against a second portion of each of said comparator arms to move said second portions in varying sequence into first and second transversely displaced positions, and
- means engaging all of said comparator arms operative to actuate said negative clutch when both first and second portions of all said comparator arms are in the same one of their respective first and second positions.

22. The drive mechanism defined in claim 19 wherein said stop control means comprises
- a series of levers pivotally mounted adjacent said pair of shafts,
- resilient means normally urging each of said levers into an inactive position,
- said levers being movable into an active position,
- a series of cam members on each of said shafts having actuating portions in varying angular positions,
- a pair of cam followers pivotally mounted on each of said levers engageably by the actuating portions of a pair of cams when said lever is in said active position, and
- mechanism operated by said cam followers for actuating said negative clutch.

23. Motion transmitting mechanism comprising
- a data shaft,
- a differential drive mechanism connected to rotate said data shaft,
- positive and negative drive means for delivering equal and opposite rotational inputs to said differential drive mechanism,
- start control means actuating said positive drive means,
- stop control means operated by means on said shaft for actuating said negative drive means when said differential drive mechanism has rotated said shaft through a predetermined arc,
- a series of motion transmitting arms movably mounted adjacent said data shaft,
- an actuating member pivotally mounted intermediate the ends thereof on each of said motion transmitting arms,
- means on said data shaft conditioning said actuating members for operation to pivot relative to said motion transmitting arms during transverse movement thereof only when said data shaft is in a fixed angular position, and
- a slave function member operated in response to operation of said actuating member.

24. The motion transmitting mechanism defined in claim 23 including a series of cams on said data shaft, and
- a series of cam followers each movable by one of said series of cams into and out of holding engagement with one end of said actuating member so that the other end of said actuating member is pivoted through an arc during movement of said motion transmitting arm, said slave function member being operable by said other end of the actuating member.

25. The motion transmitting mechanism defined in claim 24 wherein said series of cams is conditioned to move said series of cam followers into various combinations of relative positions into and out of holding engagement.

26. Motion transmitting mechanism defined in claim 23 including a series of radial lugs on said data shaft, one end of each of said motion transmitting arms being adapted to contact one of said slave function members, a stop member adjacent said one end, resilient means urging said one end away from said function member and against said stop, each of said actuating members being pivotally mounted adjacent the other end of one of said motion transmitting arms, said actuating member being movable into engagement with one of said radial lugs during transverse movement of said motion transmitting arm to produce said relative pivotal movement when said radial lug is in a specific angular position.

References Cited in the file of this patent

UNITED STATES PATENTS

| | | |
|---|---|---|
| 2,192,695 | Rainey | Mar. 5, 1940 |
| 2,330,543 | Barthelmes | Sept. 28, 1943 |
| 2,583,666 | Putman | Jan. 29, 1952 |
| 2,757,866 | Johnson | Aug. 7, 1956 |
| 2,919,004 | Henatsch | Dec. 29, 1959 |
| 3,003,094 | Gough | Oct. 3, 1961 |
| 3,007,097 | Shelley et al. | Oct. 31, 1961 |
| 3,010,653 | Canepa | Nov. 28, 1961 |